United States Patent [19]
Wiegert et al.

[11] 4,066,290
[45] Jan. 3, 1978

[54] BICYCLE FAIRING

[75] Inventors: Gerald A. Wiegert, Venice; James R. Negele, Santa Monica, both of Calif.

[73] Assignees: Gerald A. Wiegert, Venice; Richard S. Dyer, Palos Verdes Estates, both of Calif.

[21] Appl. No.: 682,092

[22] Filed: Apr. 30, 1976

[51] Int. Cl.² ............................................. B62J 17/02
[52] U.S. Cl. .................................... 296/78.1; 280/289
[58] Field of Search ........................... 296/78.1, 78 R; 280/289; D12/182

[56] References Cited
U.S. PATENT DOCUMENTS

| | | | |
|---|---|---|---|
| 2,401,245 | 5/1946 | Hobbs | 296/78.1 |
| 3,690,721 | 9/1972 | Herbert | 296/78.1 |
| 3,891,265 | 6/1975 | Blackburn | 296/78.1 |

Primary Examiner—Joseph F. Peters, Jr.
Assistant Examiner—John A. Carroll
Attorney, Agent, or Firm—Fulwider, Patton, Rieber, Lee & Utecht

[57] ABSTRACT

A streamlined, lightweight fairing attachable to the handles of a bicycle by a pair of mounting rods forming a rigid and stable mounting structure, and by clamps attaching to the front-wheel fork. The fairing presents a streamlined rounded surface to the front of the bicycle and a relatively large concave enclosure to the rear, to cover the upper portions of the bicycle and rider as viewed from the front. An integral fender substantially increases the size of the enclosure, arcuate trailing edges facilitate positioning of the rider's head and hands behind the fairing, and transparent windows may be included for forward and downward visibility.

5 Claims, 6 Drawing Figures

U.S. Patent    Jan. 3, 1978    4,066,290
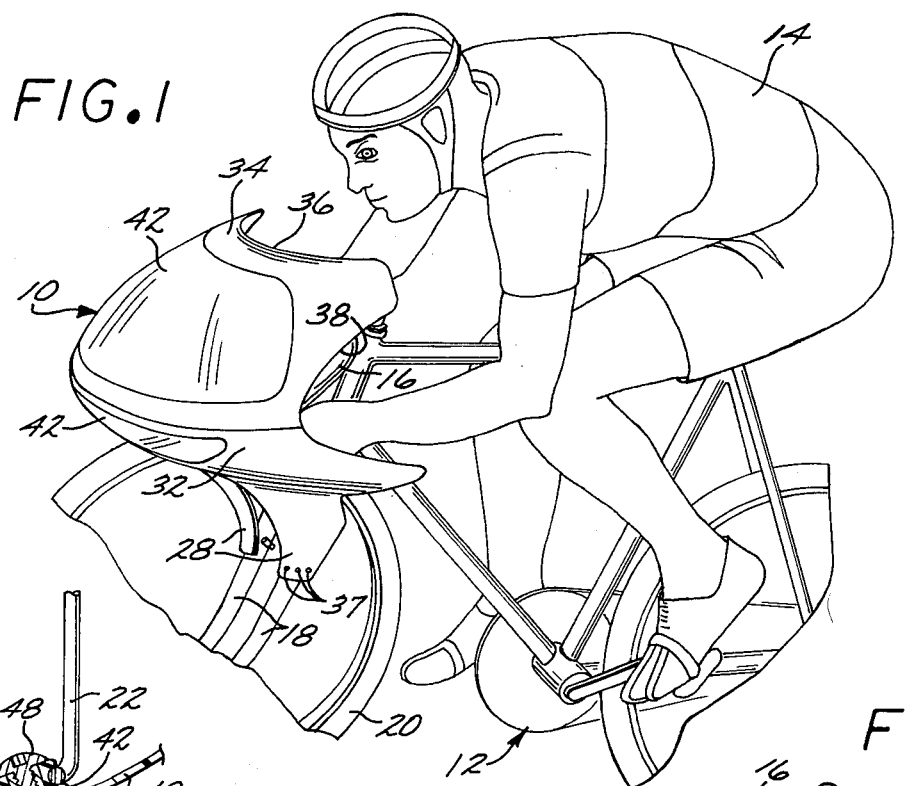
FIG. 1
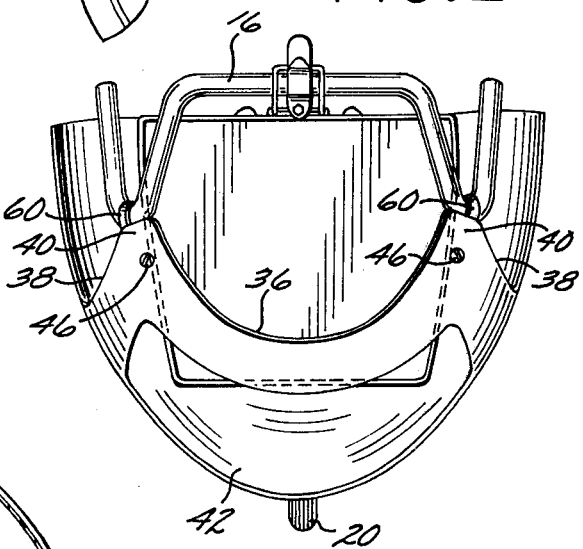
FIG. 2
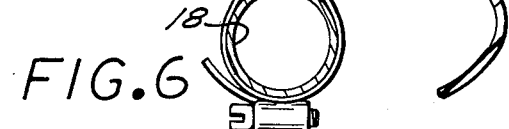
FIG. 4
FIG. 6
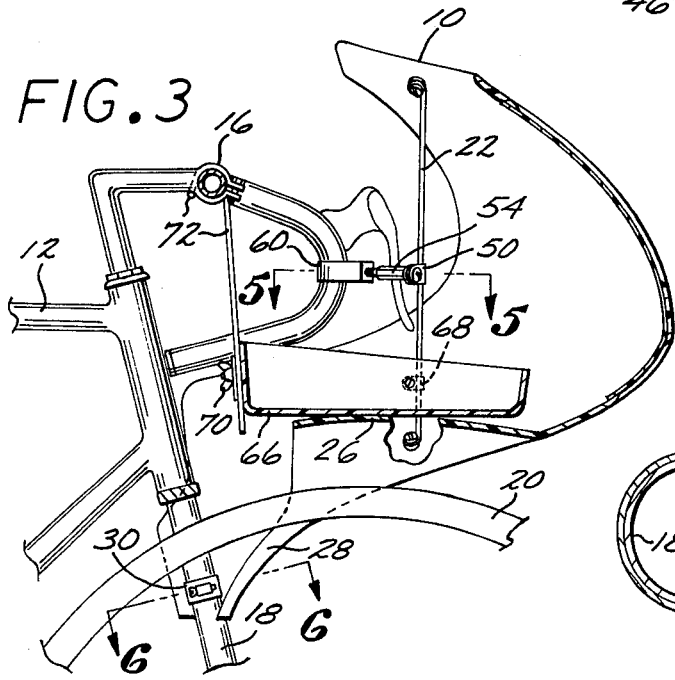
FIG. 3
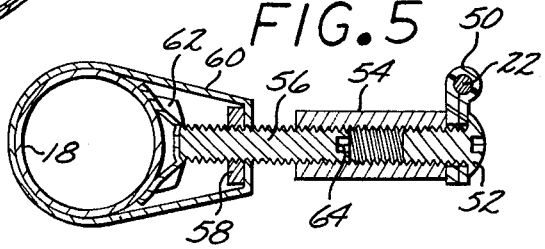
FIG. 5

BICYCLE FAIRING

BACKGROUND OF THE INVENTION

This invention relates generally to streamlined fairings for two-wheeled vehicles, and, more particularly, to fairings for bicycles.

It is well known that the wind resistance or drag associated with the movement of any vehicle may be reduced by the addition of a streamlined fairing over parts of the vehicle that would otherwise provide a significant drag resistance to motion of the vehicle. It is also well known that the most desirable streamlined shape for subsonic speeds is one having a rounded leading face, as in most subsonic aircraft. Streamlined fairings for motorcycles have been used for some years on racing motorcycles, as shown, for example, in British Pat. No. 807,507, to Mitchenall, et al. Various types of weather shields and screens have been attached to bicycles, to provide protection from the weather at the expense of increased wind resistance, but streamlined fairings have never been successfully adapted for use on bicycles.

With the increased popularity of bicycle riding as a recreational activity, and particularly the popularity of lightweight, multi-speed bicycles, there has been an increased awareness of the significant effect of wind resistance on the maximum speed attainable on a bicycle, and a consequent demand for any means of reducing the wind resistance and thereby reducing the pedaling effort required to maintain a given speed. Naturally, a bicycle fairing must not substantially increase the weight of the bicycles, or the decrease in wind resistance will be more than offset by increases in frictional resistance and inertia.

In addition to a desirable streamlined shape and lightness of weight, a bicycle fairing should have a rigid and stable mounting structure, and should cover or enclose as much of the rider's body as possible as viewed from the front. Ideally, the mounting structure should be readily adjustable for various bicycles and riders, and should be readily attachable to and removable from the bicycle. It is to these specific objectives that the present invention is directed.

SUMMARY OF THE INVENTION

The present invention resides in a streamlined bicycle fairing of lightweight construction, having a very stable and rigid mounting structure which is readily and conveniently attachable to and removable from a bicycle, and is readily adjustable to various bicycles and riders. The fairing of the invention partially encloses the bicycle handle bars and the rider's hands, although allowing for easy lateral movement of the hands as they are placed on or removed from the handle bars. The fairing also provides a relatively large enclosure for the upper portions of the bicycle and rider. The large enclosure is made possible in part by the inclusion of an integral wheel fender which allows the enclosure formed by the fairing to extend below to the wheel periphery on both sides.

Briefly, and in general terms, the fairing of the present invention includes a streamlined fairing shell shaped and sized to partially enclose the handle bars, including the rider's hands, and the front upper region of the bicycle, the shell presenting a rounded streamlined surface toward the front of the bicycle and an open concave enclosure toward the rear. The fairing shell includes a lower portion with an integral wheel fender shaped to partially surround a circumferential portion of the front wheel of the bicycle, a pair of streamlined extensions of the lower portion partially surrounding the front-wheel fork of the bicycle, and an upper portion having an arcuate trailing upper edge to allow the rider to position his head easily behind the fairing.

The fairing also includes a pair of mounting rods each attached at opposite ends to the fairing shell and clamped to one of the handles, the pair of rods being disposed generally parallel to each other and forming, with the handle bars, a rigid mounting structure by which wind forces on the fairing are transmitted rearwardly and inwardly to the bicycle handles and frame. The fairing is also attached to the bicycle structure provided by the mounting rods.

In the presently preferred embodiment of the invention, two mounting rods are attached at their upper ends to the arcuate upper rear edge of the fairing, and are attached at their lower ends to opposite sides of the lower portion of the fairing, each of the rods being coupled by suitable interconnections to two clamps near the center of the handles. More particularly, each interconnection comprises first and second sections threadable coupled to provide convenient longitudinal adjustment of the sections and consequently the fore-and-aft position of the mounted fairing. Screw-operated hose clamps are utilized to clamp the interconnections to the handles and to clamp the stream-lined extensions of the lower portion of the fairing to the front-wheel fork. The sections can be completely disconnected to permit pivotal movement of the fairing about its lower portion, and thereby facilitate access to the interior of the fairing for storage purposes.

In the preferred embodiment of the fairing, each side trailing edge of the fairing shell is also arcuately shaped to allow convenient placement and removal of the rider's hands with respect to the handle bars. Preferably, the fairing shell includes one or more transparent window sections to provide the rider with a view of the road ahead or below when his head is positioned behind or close to the fairing.

It will be appreciated from the foregoing that the bicycle fairing of the present invention provides a hitherto unavailable means of reducing the wind resistance of a bicycle and its rider. In particular, the fairing is shaped to shield from the wind as much of the upper body and upper portions of the bicycle as possible, is light in weight, and is readily attachable and adjustable on a bicycle. Other aspects and advantages of the invention, in addition to those outlined above, will become apparent from the more detailed description which follows, taken in conjunction with the accompanying drawings.

BRIEF DESCRIPTION OF THE DRAWINGS

FIG. 1 is a perspective view of a fairing embodying the present invention, shown mounted to a bicycle of which only relevant portions are shown;

FIG. 2 is a fragmentary top plan view showing how the fairing is mounted to the handles of the bicycle;

FIG. 3 is a fragmentary side elevational view, partly in section, showing in more detail how the fairing is mounted to the front-wheel fork;

FIG. 4 is a fragmentary view showing how one of the mounting rods is attached to the fairing;

FIG. 5 is an enlarged view taken substantially along the line 5—5 of FIG. 3; and FIG. 6 is an enlarged view taken substantially along the line 6—6 of FIG. 3.

DETAILED DESCRIPTION

As shown in the drawings for purposes of illustration, the present invention concerns a streamlined fairing 10 for a bicycle 12, which is shown in FIG. 1 together with a rider 14. As illustrated, the bicycle 12 has conventional handle bars 16 and a front fork structure 18 by which the front wheel 20 of the bicycle is conventionally mounted.

In accordance with one aspect of the invention, the fairing 10 is rigidly and adjustably mounted to the handle bars 16 by means of a pair of mounting rods 22 located to provide a rigid and stable mounting structure. The fairing is shaped to provide a relatively large enclosure over the handle bars 16 and the rider's hands. It is sufficiently large that the rider can crouch down behind it to shield his head and upper body. Further wind protection or streamlining is provided by an integral wheel fender 26 into which the front wheel 20 partially extends. Thus, outside surface of the fairing extends significantly below the top of the front wheel on each side thereof. The fairing 10 also includes two streamlined extensions 28, integral with the fairing, extending downwardly therefrom over portions of the front-wheel fork 18, and enclosing two hose clamps 30 by means of which the fairing is secured to the fork. In this regard, complementarly threaded fasteners 31 and 33, extending into a spacer bushing 35, provide the desired securement. The fasteners extend through a selected pair of a plurality of openings 37 provided in the extensions 38. The different openings can be selected to afford a degree of adjustment of the fairing 10 to different types or styles of bicycle.

As can be seen in the drawings, the fairing 10 presents a rounded streamlined surface toward the front of the bicycle 12, and is open to the rear to form a concave enclosure for the handle bars 16, including the rider's hands, and other upper portions of the bicycle and the rider. The fairing 10 is preferably formed as a single piece of lightwight material, such as a molded plastic or Fiberglass. It has a lower portion 32, which includes the integral fender 26 and the streamlined extensions 28, and an upper portion 34 curving rearwardly and upwardly from the front of the fairing in a generally ellipsoidal shape. It will be understood, however, that the shape of the fairing is not critical at the relatively low speeds expected of the bicycle.

The upper trailing edge of the fairing 10 is arcuately shaped, as shown at 36, to facilitate positioning of the rider's head behind the fairing, and the side portions of the fairing also have arcuate edges 38 to facilitate positioning of the hands on the handle bars. The upper portion 34 of the fairing 10 has two rearwardly projecting rounded corners 40 where the upper and side arcuate edges 36 and 38 merge.

The illustrative fairing 10 also preferably includes two transparent windows 42, one in the lower portion 32 and one in the upper portion 34, to provide a safe view of the road surface below and ahead of the bicycle 12 when the rider's head is positioned behind the fairing.

The rods 22 are generally parallel and extend vertically on opposite sides of the fairing 10. Each of the rods 22 includes looped ends 42, as best seen in FIG. 4, and each of these looped ends is received within an annular groove of a resilient bushing 44. The bushings 44 provide cushioned mounts for the ends of the rods 22 at the top and bottom of the fairing 10. For this purpose suitable openings are drilled or otherwise provided in the fairing 10 to receive headed, internally threaded studs 46 which extend through the hollow centers of the bushings 44, as seen in FIG. 4. Externally threaded bolts 48 are threaded into the studs 46 to fix the rods 22 in position.

The center portions of the rods 22 are connected to the handles of the handle bars 16 by interconnections comprising a strap 50, which extends around each rod 22; a bolt 52 extending through holes in the strap 50; and an internally threaded, externally flatted sleeve 54 which threadably receives the bolt 52 at one end and an externally threaded stud 56 at its opposite end. Each interconnection also includes a threaded nut 58 which receives a stud 56, with the nut being spot welded to a metal loop or band 60 which extends about one side of one of the handles of the bars 16. A complemental arcuate fitting 62 extends around the other side of the handle and is urgeable by the stud 56 against the handle to tightly hold the clamp 60 and fitting 62 in position. For this purpose the stud 56 is provided with an Allen wrench opening 64 to enable it to be turned or tightened.

The foregoing arrangement permits the bands 60, fittings 62, nuts 58 and studs 56 to be mounted first to the handles. Next, the sleeves 54 can be threaded onto the studs 56 until the proper fore-and-aft position of the fairing 10 is established. Finally, the bolts 52 are tightened into the sleeves 54 to maintain the desired position of the fairing. The interconnections of the fairing 10 to the handle bars thus provide not only adjustability but also provide easy demounting of the fairing from the bicycle.

The pair of mounting rods 22 provide an extremely stable and rigid mounting for the fairing 10, especially when taken together with the mounting clamps 30 on the front-wheel fork 18. It will also be apparent that the spacing between the rods 22 and the internal dimensions of the fairing 10 provide an enclosure of substantial size. This may be used in touring bicycles, for example, to enclose a rectangular, four-sided utility shelf or storage tray 66 which may be conveniently attached to the mounting rods 22 and to the handle bars 16, as best seen in FIGS. 2 and 3.

More particularly, the sides of the tray 66 are removably attached to the rods 22 by suitable clamp assemblies, 68, respectively. The rearward side of the tray 66 is attached by a wind nut assembly 70 to the lower ends of a bracket 72 of inverted U-shape which extends over the handle bars 16 at their mid-point. The assembly 70 is vertically adjustable on the bracket 72, and the assemblies 68 are also vertically adjustable onthe rods 22, to thereby adjust the height of the tray 66 as desired.

Access to the tray 66 for storing relatively large packages and the like which cannot pass between the handle bars and the upper portion of the fairing 10 can be facilitated by first disconnecting the sleeves 54 and studs 56 and thereafter pivoting the fairing 10 upwardly and forwardly about the fasteners 31 and 33.

It will be appreciated that, although a particular form of the invention has been illustrated and described in detail, it would be possible to make minor alterations to the fairing without departing from the spirit and scope of the invention. Accordingly, the invention is not to be limited except as by the appended claims.

We claim:

1. A bicycle fairing comprising:
a fairing shell shaped and sized to partially shield the front upper region of a bicycle and rider, including the handle bars and rider's hands, said fairing shell presenting a rounded streamlined surface toward the front of the bicycle and a concave enclosure toward the rear, said fairing shell including a lower portion having an integral front-wheel fender to provide improved streamlining and to maximize the size of said enclosure, said lower portion further having a pair of streamlined extensions partially surrounding the front-wheel fork of the bicycle, said fairing shell further including an upper portion having a trailing upper edge of arcuate configuration to facilitate positioning to the rider's head behind said fairing shell, said upper and lower portions further having trailing side edges which merge in an arcuate configuration to facilitate positioning of the rider's hands behind said fairing shell;
a pair of generally upright, parallel, horizontally spaced apart mounting rods attached at their upper ends to said upper portion of said fairing shell and attached at their lower ends to said lower portion of said fairing shell;
interconnection means operative to connect said rods to the handles of the handle bars, each interconnection means including adjustably extensible sections for adjusting the distance between said fairing shell and the front of the handles, each interconnection means further being vertically adjustably movable on said rods for adjusting the vertical location of said fairing shell relative to the handles; and
clamping means for clamping said streamlined extensions of said lower portion to the front-wheel fork.

2. A bicycle fairing as set forth in claim 1, wherein said fairing shell includes at least one transparent window to provide forward and downward visibility through said fairing shell.

3. A bicycle fairing as set forth in claim 1, wherein said enclosure presented to the rear of said fairing shell is adapted to retain a storage bag.

4. A bicycle fairing comprising:
a fairing shell shaped and sized to partially shield the front upper region of a bicycle and rider, including the handle bars and rider's hands, said fairing shell presenting a rounded streamlined surface toward the front of the bicycle and a concave enclosure toward the rear, said fairing shell including a lower portion having an integral front-whell fender to provide improved streamlining and to maximize the size of said enclosure, said lower portion further having a pair of streamlined extensions partially surrounding the front-wheel fork of a bicycle, said fairing shell further including an upper portion having a trailing upper edge of arcuate configuration to facilitate positioning of the rider's head behind said fairing shell, said upper and lower portions further having trailing side edges which merge in an arcuate configuration to facilitate positioning of the rider's hands behind said fairing shell;
a pair of generally upright, horizontally spaced apart mounting rods attached at their upper ends to said upper portion of said fairing shell and attached at their lower ends to said lower portion of said fairing shell;
clamping means for clamping said streamlined extensions of said lower portion to the front-wheel fork; and
interconnection means operative to connect said rods to the handles of the handle bars, each interconnection means including adjustably extensible sections for adjusting the distance between said fairing shell and the front of the handles, said sections being disconnectable whereby said fairing shell is pivotable about said clamping means.

5. A bicycle fairing comprising:
a fairling shell shaped and sized to partially shield the front upper region of a bicycle and rider, including the handle bars and rider's hands, said fairing shell presenting a rounded streamlined surface toward the front of the bicycle and a concave enclosure toward the rear, said fairing shell including a lower portion having an integral front-wheel fender to provide improved streamlining and to maximize the size of said enclosure, said lower portion further having a pair of streamlined extensions partially surrounding the front-wheel fork of the bicycle, said fairing shell further including an upper portion having a trailing upper edge of arcuate configuration to facilitate positioning of the rider's head behind said fairing shell, said upper and lower portions further having trailing side edges which merge in an arcuate configuration to facilitate positioning of the rider's hands behind said fairing shell;
a pair of generally upright, horizontally spaced apart mounting rods attached at their upper ends to said upper portion of said fairing shell and attached at their lower ends to said lower portion of said fairing shell;
a tray disposed between said rods and within said fairing shell;
first fastening means connecting the sides of said tray to said rods;
second fastening means for connecting the rear of said tray to the handle bars;
interconnection means operative to connect said rods to the handles of the handle bars, each interconnection means including adjustably extensible sections for adjusting the distance between said fairing shell and the front of the handles; and
clamping means for clamping said streamlined extensions of said lower portion to the front-wheel fork.

* * * * *

UNITED STATES PATENT OFFICE
CERTIFICATE OF CORRECTION

Patent No. 4,066,290　　　　　　　Dated January 3, 1978

Inventor(s) Gerald A. Wiegert and James R. Negele

It is certified that error appears in the above-identified patent and that said Letters Patent are hereby corrected as shown below:

In the specification, Column 1, line 60, delete "to" (second occurrence). In Column 3, line 35, correct "38" to read --28--. In Column 3, line 45, correct "Fiberglass" to read --Fiberglas--. In Column 4, line 53, correct "wind" to read --wing--.

In the Claims, Column 5, line 18 (Claim 1) delete "to" (second occurrence) and substitute therefor --of--. In Column 5, line 52 (Claim 4) correct "front-whell" to read --front-wheel--. In Column 6, line 22 (Claim 5) correct "fairling" to read --fairing--.

Signed and Sealed this

Twenty-seventh Day of June 1978

[SEAL]

Attest:

RUTH C. MASON
Attesting Officer

DONALD W. BANNER
Commissioner of Patents and Trademarks